(12) United States Patent
Zhu et al.

(10) Patent No.: US 8,937,612 B2
(45) Date of Patent: Jan. 20, 2015

(54) COORDINATE LOCATING METHOD, COORDINATE LOCATING DEVICE, AND DISPLAY APPARATUS COMPRISING THE COORDINATE LOCATING DEVICE

(75) Inventors: Xiuling Zhu, Tai Po (HK); Yaojun Feng, Shen Zhen (CN)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 834 days.

(21) Appl. No.: 12/700,598

(22) Filed: Feb. 4, 2010

(65) Prior Publication Data
US 2011/0109565 A1    May 12, 2011

(51) Int. Cl.
G06F 3/042    (2006.01)
G06F 3/041    (2006.01)

(52) U.S. Cl.
CPC ............ G06F 3/0416 (2013.01); G06F 3/0428 (2013.01)
USPC .......................................... 345/175; 345/173

(58) Field of Classification Search
CPC ...... G06F 3/0325; G06F 3/0321; G06F 3/042
USPC .................................................. 345/173, 175
See application file for complete search history.

(56) References Cited

U.S. PATENT DOCUMENTS

| | | | |
|---|---|---|---|
| 4,553,842 A | 11/1985 | Griffin | |
| 4,811,004 A | 3/1989 | Person et al. | |
| 4,820,050 A | 4/1989 | Griffin | |
| 4,980,547 A | 12/1990 | Griffin | |
| 4,990,901 A | 2/1991 | Beiswenger | |
| 5,484,966 A | 1/1996 | Segen | |
| 5,936,723 A | 8/1999 | Schmidt et al. | |
| 6,480,187 B1 | 11/2002 | Sano et al. | |
| 6,838,657 B2 | 1/2005 | Iwamoto et al. | |

(Continued)

FOREIGN PATENT DOCUMENTS

| CN | 1208190 A | 2/1990 |
|---|---|---|
| CN | 101145091 A | 3/2008 |

(Continued)

OTHER PUBLICATIONS

Chinese Office Actions for corresponding Chinese Patent Application No. 201010199400.1 mailed Feb. 3, 2012 and Nov. 5, 2012.

(Continued)

*Primary Examiner* — William Boddie
*Assistant Examiner* — Sahlu Okebato
(74) *Attorney, Agent, or Firm* — Merchant & Gould P.C.

(57) ABSTRACT

A coordinate locating device capable of locating the coordinates of two or more objects is provided for a display apparatus. The coordinate locating device includes a first detector arranged together with a first light source at a first corner of the coordinate locating device, a second detector arranged together with a second light source at a second corner of the coordinate locating device, at least one reflector configured to reflect light from the first and second light sources, and a mirror arranged on a first edge of the coordinate locating device, configured to reflect mirrored images of two or more objects intruding the coordinate locating device, wherein the first and second detectors detect real images of the two or more objects, and at least one of the first and second detectors further detects the mirrored images of the two or more objects reflected by the mirror.

8 Claims, 13 Drawing Sheets

(56) References Cited

U.S. PATENT DOCUMENTS

| | | | |
|---|---|---|---|
| 7,515,141 B2 * | 4/2009 | Kobayashi | 345/173 |
| 7,538,894 B2 * | 5/2009 | Kobayashi | 356/614 |
| 7,589,715 B2 * | 9/2009 | Tanaka et al. | 345/175 |
| 7,932,899 B2 | 4/2011 | Newton et al. | |
| 8,338,725 B2 | 12/2012 | Fan et al. | |
| 2005/0200613 A1 | 9/2005 | Kobayashi et al. | |
| 2006/0232568 A1 | 10/2006 | Tanaka et al. | |
| 2006/0232792 A1 | 10/2006 | Kobayashi | |
| 2008/0068352 A1 | 3/2008 | Worthington et al. | |
| 2008/0143682 A1 | 6/2008 | Shim et al. | |
| 2009/0027694 A1 | 1/2009 | Kobayashi | |
| 2009/0046063 A1 | 2/2009 | Chen | |
| 2009/0058833 A1 | 3/2009 | Newton | |
| 2009/0066662 A1 | 3/2009 | Liu et al. | |
| 2009/0213093 A1 | 8/2009 | Bridger | |
| 2009/0219256 A1 | 9/2009 | Newton | |
| 2009/0244018 A1 * | 10/2009 | Lin et al. | 345/173 |
| 2009/0277694 A1 | 11/2009 | Hansen et al. | |
| 2009/0278816 A1 | 11/2009 | Colson | |
| 2009/0295755 A1 | 12/2009 | Chapman et al. | |
| 2010/0045629 A1 | 2/2010 | Newton | |
| 2010/0214268 A1 * | 8/2010 | Huang et al. | 345/175 |
| 2010/0289773 A1 * | 11/2010 | Lin et al. | 345/175 |
| 2010/0309169 A1 | 12/2010 | Lieberman et al. | |
| 2011/0074735 A1 | 3/2011 | Wassvik et al. | |
| 2011/0128218 A1 | 6/2011 | Kroeker et al. | |
| 2011/0128219 A1 | 6/2011 | Sirotich et al. | |
| 2011/0141062 A1 | 6/2011 | Yu et al. | |
| 2011/0148758 A1 | 6/2011 | Hashimoto | |
| 2011/0169727 A1 | 7/2011 | Akitt | |
| 2011/0254809 A1 | 10/2011 | Yu et al. | |
| 2012/0026084 A1 | 2/2012 | Suggs | |
| 2012/0056807 A1 | 3/2012 | Chapman et al. | |

FOREIGN PATENT DOCUMENTS

| | | |
|---|---|---|
| CN | 101546235 A | 9/2009 |
| CN | 101609381 A | 12/2009 |
| CN | 101650620 A | 2/2010 |
| TW | 200906468 A | 2/2009 |
| TW | 201329823 A | 7/2013 |

OTHER PUBLICATIONS

Taiwan Office Action for corresponding Taiwan Patent Application No. 100104020 mailed Oct. 24, 2013.

Taiwan Office Action for corresponding Taiwan Patent Application No. 100134911 mailed Mar. 21, 2014.

* cited by examiner

200

- capturing real images with the first and second detectors, and capturing mirrored images reflected by the mirror with the first detector ~210

- obtaining a first group of lines, a second group of lines, and a group of mirrored lines according to the captured real and mirrored images ~220

- obtaining a first group of possible coordinates with two of the first group of lines, the second group of lines, and the group of mirrored lines ~231

- obtaining a second group of possible coordinates with the another two of the first group of lines, the second group of lines, and the group of mirrored lines ~232

- determining the coordinates of two or more objects to be at overlapping coordinates between the first and second groups of possible coordinates ~240

FIG. 2

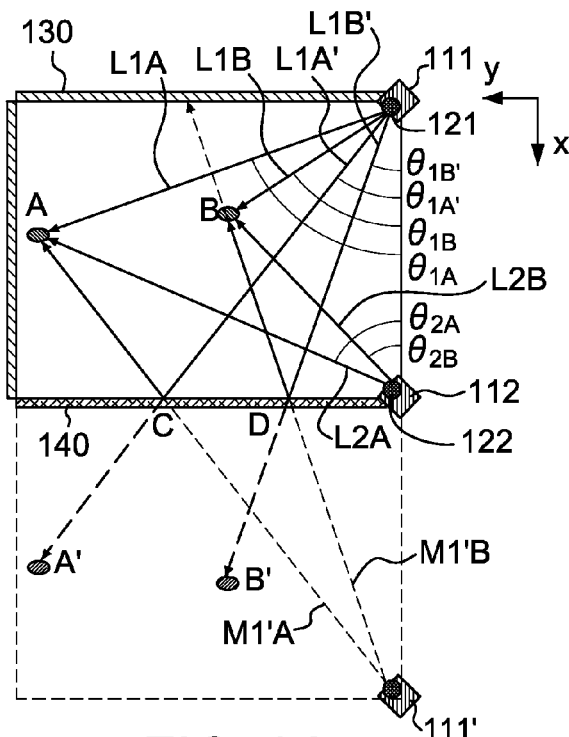
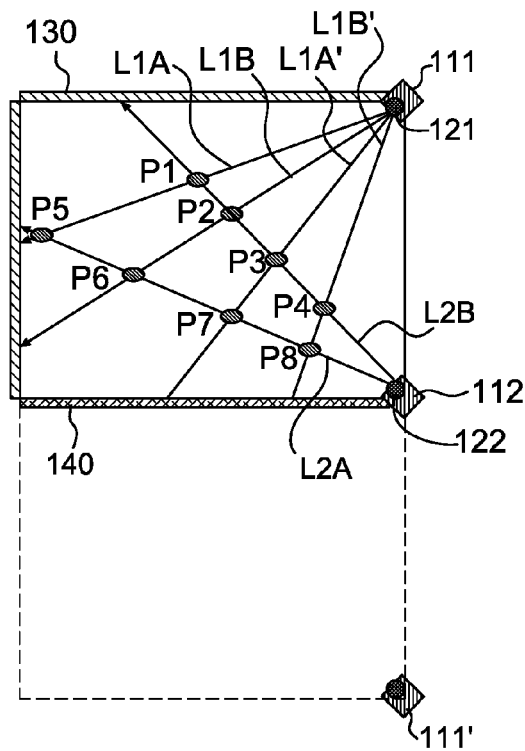
FIG. 3A
FIG. 3B
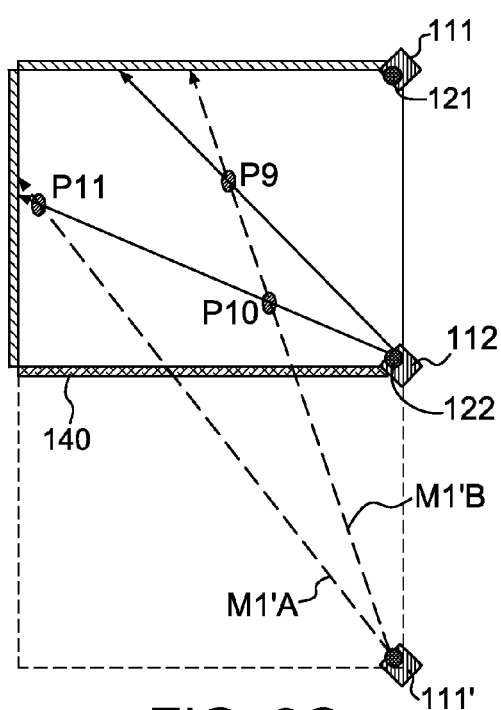
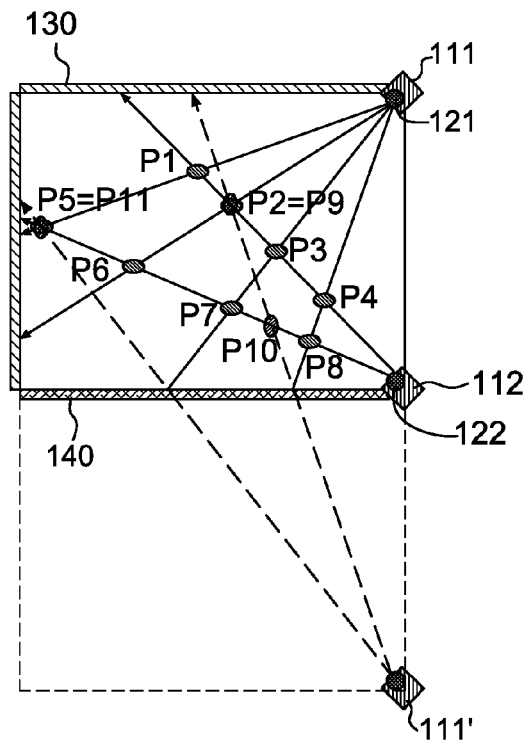
FIG. 3C
FIG. 3D

COORDINATE LOCATING METHOD, COORDINATE LOCATING DEVICE, AND DISPLAY APPARATUS COMPRISING THE COORDINATE LOCATING DEVICE

FIELD OF THE INVENTION

The invention relates generally to a coordinate locating device and a coordinate locating method, and, more particularly, to a coordinate locating device capable of locating the coordinates of multiple objects and a coordinate locating method employing the same.

BACKGROUND OF THE INVENTION

Various coordinate locating devices are known for locating the coordinates of an object. Some coordinate locating devices can detect the coordinates of an object from a pointing instrument, such as a pen, a fingertip, or a specific device dedicated for use with such devices. Accordingly, a user can input information by the pointing instrument.

Common techniques employed in conventional coordinate locating devices for locating the coordinates of an object include mechanical buttons, crossed light beams, acoustic surface waves, capacitance sensing, and resistive materials. Among these techniques, those employing crossed light beams are not limited by the display panel size and are therefore cost competitive.

For example, Griffin, U.S. Pat. No. 4,820,050 discloses a solid-state optical position determining apparatus having an LED light source and an image sensor. However, the apparatus can only locate the coordinates of a single object, resulting in undesirably limited applications.

Another example is an apparatus disclosed by Segen, U.S. Pat. No. 5,484,966, entitled "sensing stylus position using single 1-D image sensor." The apparatus utilizes two mirrors and one image sensor, but can also locate the coordinates of a single object.

Surpassing the above two conventional techniques, US Patent Publication. No. 2009/0,066,662 by Liu, Yun-Cheng, et al. proposed a system capable of distinguishing multiple touch points, and US Patent Publication. No. 2008/0143682 by Shim, Yeon Shim, et al. also proposed a display device having a multi-touch recognition function. However, in the proposals, at least three image sensors are required, respectively, thus greatly increasing manufacturing costs.

SUMMARY OF THE INVENTION

In view of above, a coordinate locating device is provided that has the ability to locate the coordinates of two or more objects while having lower manufacturing costs than the conventional technologies. Additionally, a display apparatus employing the coordinate locating device and a coordinate locating method that can be applied to the coordinate locating device are also provided.

In one aspect, a coordinate locating device is provided for a display apparatus, comprising: a first detector arranged together with a first light source at a first corner of the coordinate locating device; a second detector arranged together with a second light source at a second corner of the coordinate locating device; at least one reflector configured to reflect light from the first and second light sources; and a mirror arranged on a first edge of the coordinate locating device, configured to reflect mirrored images of two or more objects intruding the coordinate locating device, wherein the first and second detectors detect real images of the two or more objects, and at least one of the first and second detectors further detects the mirrored images of the two or more objects reflected by the mirror.

Additionally, a display apparatus is also provided, comprising the coordinate locating device and a display panel, wherein the coordinate locating device is arranged surrounding the display panel.

In another aspect, a coordinate locating method is provided for a coordinate locating device having a first detector arranged together with a first light source, a second detector arranged together with a second light source, at least one reflector, and a mirror. The method comprises capturing real images of two or more objects intruding the coordinate locating device with the first and second detectors; capturing mirrored images of the two or more objects reflected by the mirror with at least one of the first and second detectors; obtaining a first group of lines, a second group of lines, and at least one group of mirrored lines according to the captured real and mirrored images of the two or more objects; and locating the coordinates of the two or more objects with the first group of lines, the second group of lines, and the at least one group of mirrored lines.

In further another aspect, another coordinate locating device is provided for a display apparatus, comprising: a first detector arranged at a first corner of the coordinate locating device; a second detector arranged at a second corner of the coordinate locating device; one or more light bars configured to emit light; and a mirror arranged on a first edge of the coordinate locating device, configured to reflect mirrored images of two or more objects intruding the coordinate locating device, wherein the first and second detectors detect the two or more objects illuminated by the one or more light bars, and at least one of the first and second detectors further detects the mirrored images of the two or more objects reflected by the mirror.

Additionally, another display apparatus is also provided, comprising the coordinate locating device and a display panel, wherein the coordinate locating device is arranged surrounding the display panel.

In yet further another aspect, a coordinate locating method is provided for a coordinate locating device having a first detector, a second detector, one or more light bars, and a mirror. The method comprises capturing real images of two or more objects intruding the coordinate locating device illuminated by the one or more light bars with the first and second detectors; capturing mirrored images of the two or more objects reflected by the mirror with at least one of the first and second detectors; obtaining a first group of lines, a second group of lines, and at least one group of mirrored lines according to the captured real and mirrored images of the two or more objects; and locating the coordinates of the two or more objects with the first group of lines, the second group of lines, and the at least one group of mirrored lines.

These and other features, aspects, and embodiments are described below in the section entitled "Detailed Description of the Invention."

BRIEF DESCRIPTION OF THE DRAWINGS

Features, aspects, and embodiments are described in conjunction with the attached drawings, in which:

FIG. 2 is a flowchart showing steps of a locating procedure to locate the coordinates of two or more objects intruding the coordinate locating device of FIG. 1A in accordance with an embodiment;

FIGS. 3A-3D are exemplary diagrams for explaining how the steps of FIG. 2 can be performed in accordance with a specific embodiment;

DETAILED DESCRIPTION OF THE INVENTION

Figure 1A:
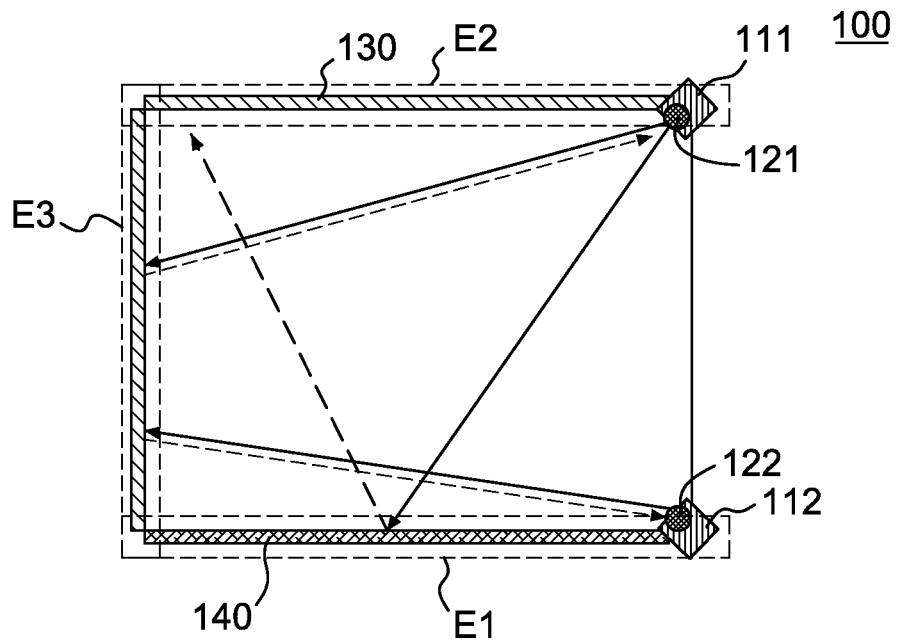
FIG. 1A is a schematic diagram showing the structure of a coordinate locating device in accordance with an embodiment.
Figure 1B:
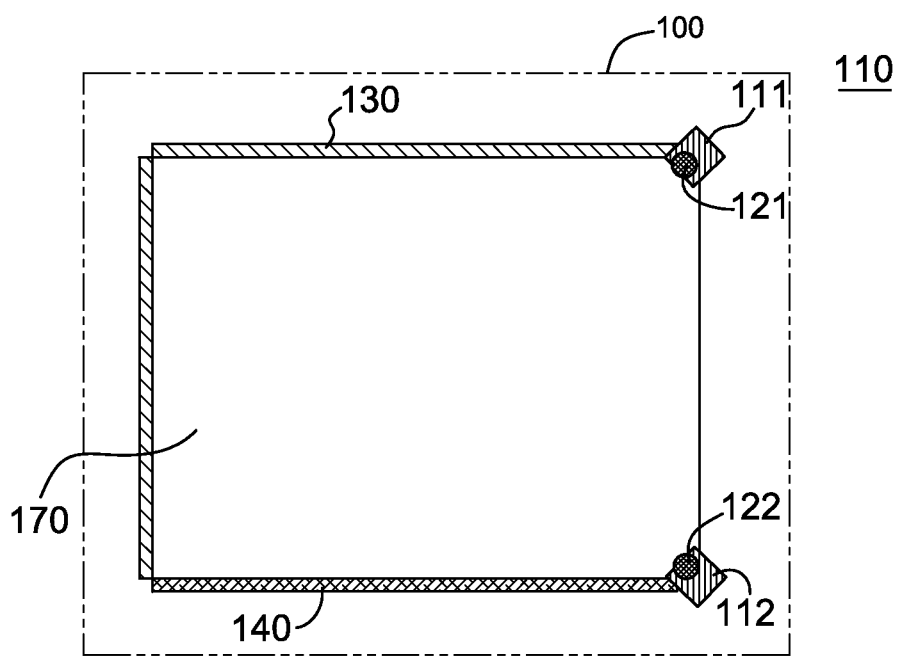
FIG. 1B is a schematic diagram showing the structure of a display apparatus employing the coordinate locating device of FIG. 1A in accordance with an embodiment.

FIG. 1A is a schematic diagram showing the structure of a coordinate locating device 100 in accordance with an embodiment; and FIG. 1B is a schematic diagram showing the structure of a display apparatus 110 employing the coordinate locating device 100 of FIG. 1A in accordance with an embodiment.

As shown in FIG. 1A, the coordinate locating device 100 can include a first detector 111 arranged together with a first light source 121 at a corner on an edge E2 of the coordinate locating device 100, and a second detector 112 arranged together with a second light source 122 at another corner on an edge E1 of the coordinate locating device 100 opposite to the edge E2.

Moreover, the coordinate locating device 100 can further include at least one reflector 130 configured to reflect the light from the first and second light sources 121 and 122.

Furthermore, the coordinate locating device 100 can include a mirror 140, which can be arranged on the edge E1 of the coordinate locating device 100 opposite to the edge E2. The mirror 140 can be configured to reflect the light from at least one of the first and second light sources 121 and 122. When an object intrudes the coordinate locating device 100, it can block the light from the first and second light sources 121 and 122 and the light reflected by the mirror 140, resulting in a mirrored image (or so-called virtual image) of the object that is symmetric with the real image of the object with respect to the mirror 140. The real and mirrored images can then be detected or captured by the first and second detectors 111 and 112.

In an embodiment, preferably, the reflector 130 can be placed on edges E2 and E3 so as to effectively reflect the light emitted from the first and second light sources 121 and 122 along various incidence directions. Additionally, the reflector 130 can be preferably implemented as a retro-reflector, which can reflect while minimally scattering the light from the first and second light sources 121 and 122. In other words, the light emitted from the first and second light sources 121 and 122 along an incidence direction onto the retro-reflector can be reflected back by the retro-reflector along a reflection direction that is parallel but opposite to the incidence direction. When an object to be located intrudes the coordinate locating device 100, it can block the light from the first and second light sources 121 and 122, resulting in a so-called real image of the object that can then be captured by the first and second detectors 111 and 112.

In an embodiment, each of the first and second detectors 111 and 112, for example, can be an image sensor (e.g., a linear image sensor), a camera, or a photo diode (PD) that can be configured to detect or capture images. On the other hand, each of the first and second light sources 121 and 122 can include a light emitting device, which can, for example, be a light emitting diode (LED) such as an infrared LED, or a laser source. Optionally, each of the first and second light sources 121 and 122 can further include a light shaping device configured to shape the light emitted form the light emitting device. The light shaping device may for example be a scanning mirror, lens such as Powell lens, or a diffractive optical element for transforming the light emitted from the light emitting device into divergent light.

In another embodiment, the coordinate locating device 100 can further include an interface (not shown) that is connectable to a display apparatus such as that shown in FIG. 1B.

Referring to FIG. 1B, the display apparatus 110 can include a display panel 170 where objects to be located can move, stay, or reside. Additionally, the display apparatus 110 also includes the coordinate locating device 100, which is arranged surrounding the display panel 170 so as to locate the coordinates of the objects.

With such an implementation, real images of objects intruding the coordinate locating device 100 can be captured by both the first and second detectors 111 and 112. In addition, mirrored images of the objects can be reflected by the mirror 140 and then captured by the first detector 111. After the real images and mirrored images of the objects are both captured, the coordinates of the two or more objects can be determined accordingly. Details about the determination are provided in sequential embodiments as shown in FIGS. 2 and 3A-3D.

FIG. 2 is a flowchart showing steps of a locating procedure 200 to locate the coordinates of two or more objects intruding the coordinate locating device 100 of FIG. 1A in accordance with an embodiment. FIGS. 3A-3D are exemplary diagrams for explaining how the steps of FIG. 2 can be performed in accordance with a specific embodiment. In the following descriptions, the number of objects to be located is taken as two for purpose of illustration, and is not meant to imply a limitation of the disclosure.

Referring both to FIGS. 2 and 3A, the locating procedure 200 is started at step 210, where images of two objects can be captured by the first and second detectors 111 and 112. The images of the two objects can include real images A and B, and mirrored images A' and B' reflected by the mirror 140. Described specifically, real images A and B of two objects can be captured by both the first detector 111 and the second detector 112. Additionally, the mirrored images A' and B' of the two objects can be captured by the first detector 111.

Next, the locating procedure 200 proceeds to step 220 to obtain a first group of lines including lines L1A, L1B, L1A', and L1B', a second group of lines L2A and L2B, and a group of mirrored lines M1'A and M1'B, according to the real images A and B and mirrored images A' and B' of the two objects captured in step 210.

Specifically, the lines L1A, L1B, L1A', and L1B' in the first group of lines can all extend from the first detector 111, and cross the real image A, the real image B, the mirrored image A', and the mirrored image B' of the two objects, respectively. Similarly, the lines L2A and L2B in the second group of lines can both extend from the second detector 112, and cross the real images A and B of the two objects, respectively. On the other hand, the lines M1'A and M1'B in the group of mirrored lines can both extend from a mirrored first detector 111' (not a real component) symmetric with the first detector 111 with respect to the mirror 140, and cross the real images A and B of the two objects, respectively.

Figure 4:
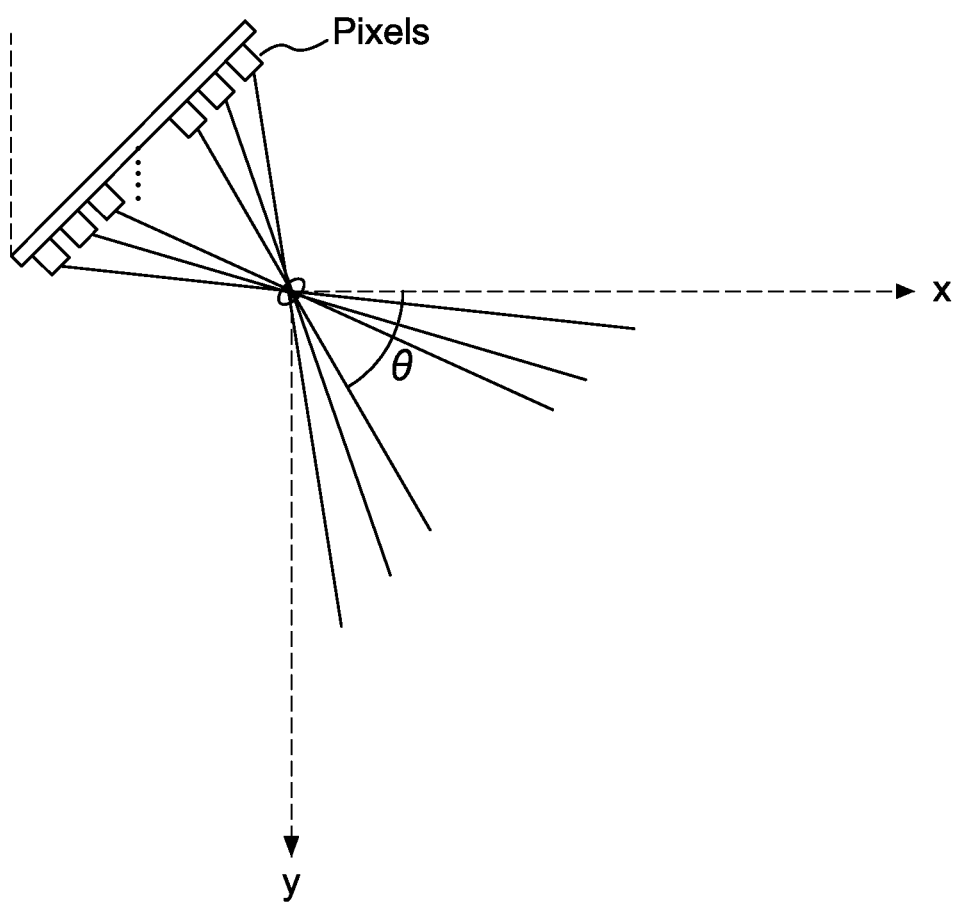
FIG. 4 is a diagram illustrating the relationship between pixel number and detection angle in each of the first and second detectors of FIG. 1A in accordance with an embodiment.
Figure 5A:
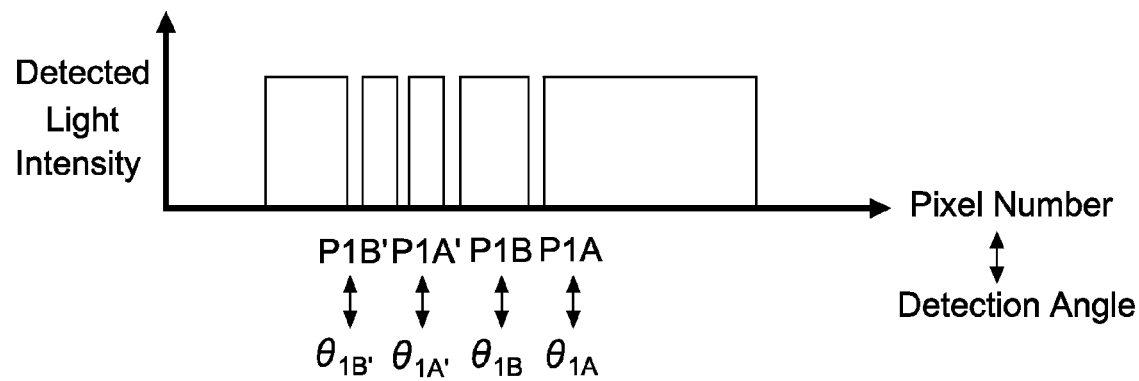
FIGS. 5A and 5B are exemplary diagrams respectively illustrating the variation in detected light intensity in relation to pixel numbers of the first and second detectors of FIG. 1A in accordance with an embodiment.
Figure 5B:
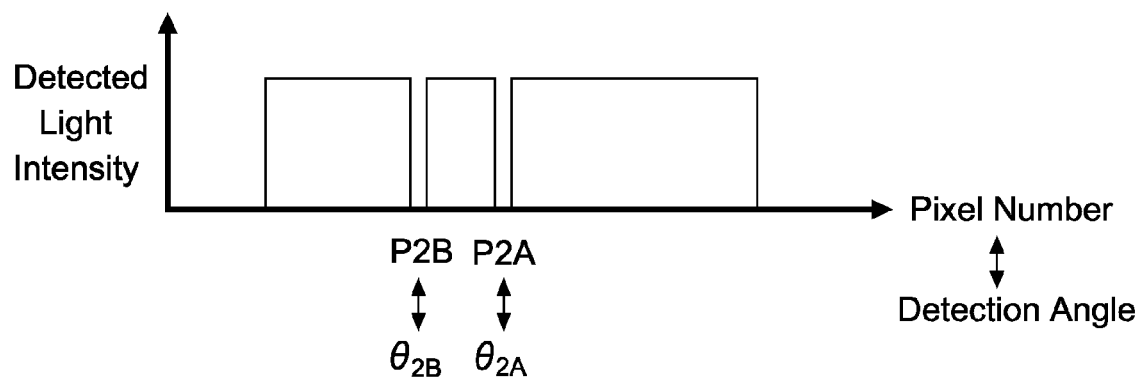

Details about how the first group of lines L1A, L1B, L1A', and L1B' and the second group of lines L2A and L2B, and the group of mirrored lines M1'A and M1'B can be obtained in step 220 of FIG. 2 are further explained with sequential embodiments shown in FIGS. 4 and 5A-5B.

FIG. 4 is a diagram illustrating the relationship between pixel number and detection angle in each of the first and second detectors 121 and 122 in accordance with an embodiment where the detectors 121 and 122 are both implemented as linear image sensors. As shown, the first or second detector 121 or 122 can have a plurality of pixels, each configured to detect light intensity at a corresponding detection angle denoted as "θ."

FIGS. 5A and 5B are exemplary diagrams respectively illustrating the variation in detected light intensity in relation to pixel numbers of the first and second detectors 121 and 122 for the embodiment shown in FIG. 3A.

Referring both to FIGS. 3A and 5A, since the light intensities detected by pixels P1B', P1A', P1B, and P1A of the first detector 111 are relatively low, detection angles $\theta_{1B'}$, $\theta_{1A'}$, $\theta_{1B}$, $\theta_{1A}$ can be obtained, respectively corresponding to the pixels P1B', P1A', P1B, and P1A according to the relationship shown in FIG. 4. Accordingly, lines can be extended from the first detector 111 along the detection angles $\theta_{1B'}$, $\theta_{1A'}$, $\theta_{1B}$, $\theta_{1A}$ to serve as the lines L1B', L1A', L1B, and L1A in the first group of lines, which can thus cross the mirrored images B', A' and real images B and A of the two objects. The first group of lines L1B', L1A', L1B, and L1A are possible lines on which the two objects can be preliminarily estimated to be located.

Additionally, after the first group of lines L1B', L1A', L1B, and L1A are obtained, a plurality of cross points of lines L1B', L1A', L1B, and L1A and the mirror 140, e.g., points C and D in the embodiment, can be obtained. Lines can then be extended from the mirrored first detector 111' across the cross points C and D to serve as the lines M1'A and M1'B in the group of mirrored lines, which can thus cross the real images A and B of the two objects. The group of mirrored lines M1'A and M1'B are also lines on which the two objects can be preliminarily estimated to be located.

Similarly, referring both to FIGS. 3A and 5B, because the light intensities detected by pixels P2B and P2A of the second detector 112 are relatively low, detection angles $\theta_{2B}$ and $\theta_{2A}$ can be obtained respectively corresponding to the pixels P2B and P2A according to the relationship shown in FIG. 4. Accordingly, lines can be extended from the second detector 112 along the detection angles $\theta_{2B}$, $\theta_{2A}$ to serve as the lines L2B and L2A in the second group of lines, which can thus cross the real images B and A of the two objects. The second group of lines L2B, and L2A are also lines on which the two objects can be preliminarily estimated to be located.

In summary, after step 220 is completed, it can be preliminarily estimated that the two objects are located on two lines in the first group of lines L1A, L1B, L1A', and L1B', on the second group of lines L2A and L2B, and also on the group of mirrored lines M1'A and M1'B.

Turning back to FIG. 2, the locating procedure 200 can enter steps 231 and 232, which can be performed simultaneously or sequentially. In step 231, a first group of possible coordinates can be obtained with two groups of the first group of lines L1A, L1B, L1A', and L1B', the second group of lines L2A and L2B, and the group of mirrored lines M1'A and M1'B. As shown in FIG. 3B, the first group of possible coordinates can, for purpose of example without limiting the disclosure, include points P1-P8, which are cross points of the first group of lines L1A, L1B, L1A', and L1B' and the second group of lines L2A and L2B.

Similarly, in step 232, a second group of possible coordinates can be obtained with another two groups of the first group of lines L1A, L1B, L1A', and L1B', the second group of lines L2A and L2B, and the group of mirrored lines M1'A and M1'B. As shown in FIG. 3C, the second group of coordinates can for purpose of example without limiting the disclosure, include points P9, P10, and P11, which are cross points of the second group of lines L2A and L2B and the group of mirrored lines M1'A and M1'B.

It is noted that the first and second group of lines are used in step 231 to obtain the first group of possible coordinates, and the second group of lines and the mirrored group of lines are used in step 232 to obtain the second group of possible coordinates. However, in other embodiments, different two groups can be used to obtain the respective group of possible coordinates in each of the step 231 and 232.

Next, the locating procedure proceeds to step 240, where the coordinates of the two objects can be determined to be at overlapping coordinates between the first group of possible coordinates (points P1-P8) and the second group of possible coordinates (points P9-P11). Referring to FIG. 3D, after comparing the first and second group of possible coordinates P1-P8 and P9-P11, it can be found that the points P2 and P9 overlap with each other and the points P5 and P11 overlap with each other. As a result, the coordinates of the two objects can be determined to be at the overlapping coordinates, i.e., points P2 (or P9) and P5 (or P11).

Figure 6A:
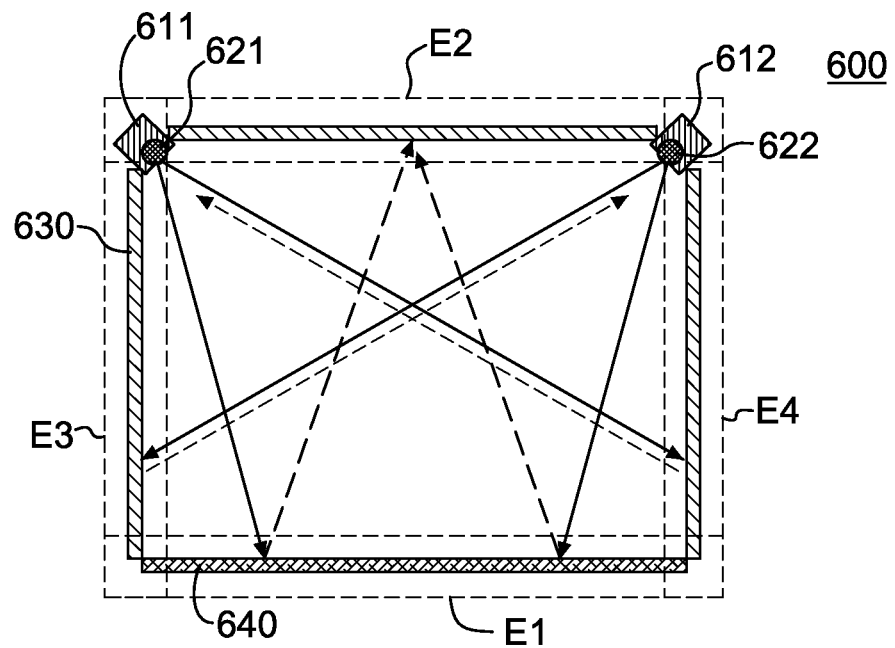
FIG. 6A is a schematic diagram showing the structure of a coordinate locating device in accordance with an embodiment.
Figure 6B:
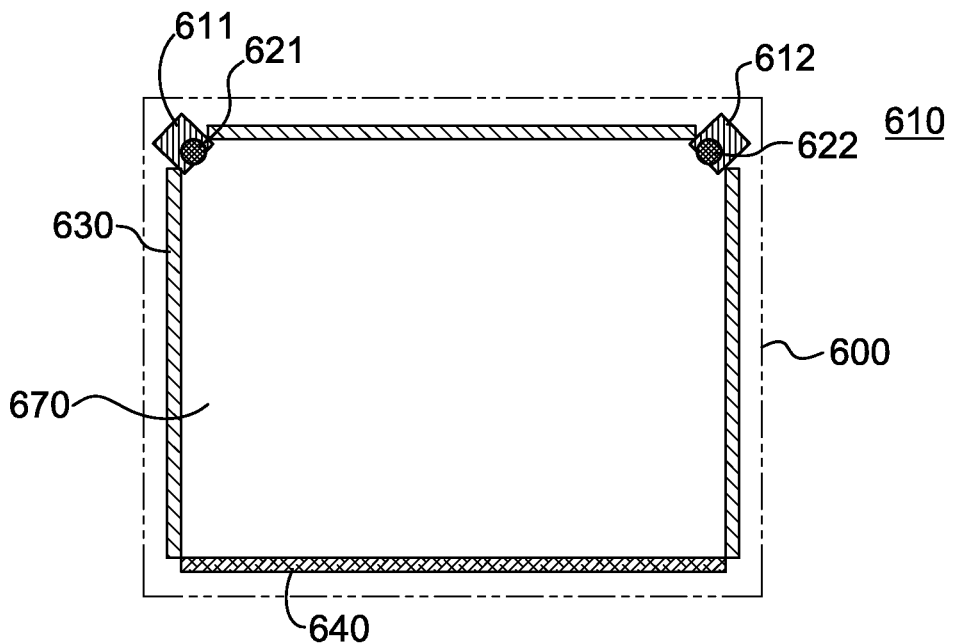
FIG. 6B is a schematic diagram showing the structure of a display apparatus employing the coordinate locating device of FIG. 6A in accordance with an embodiment.

FIG. 6A is a schematic diagram showing the structure of a coordinate locating device 600 in accordance with another embodiment; and FIG. 6B is a schematic diagram showing the structure of a display apparatus 610 employing the coordinate locating device 600 of FIG. 6A in accordance with an embodiment.

The coordinate locating device 600 of FIG. 6A differs from the coordinate locating device 100 of FIG. 1A mainly in the positions of first and second detectors and first and second light sources. In the coordinate locating device 100, the first detector 111 and first light source 121, and the second detector 112 and second light source 122, are placed on different edges E2 and E1, respectively. However, in the coordinate locating device 600, the first detector 611 and first light source 621, and the second detector 612 and second light source 622 are placed on the same edge E2.

In addition, due to the difference of the positions of the first and second detectors and the first and second light sources, the position of at least one reflector 630 in the coordinate locating device 600 can also be different from that of the reflector 130 of FIG. 1. Preferably, the at least one reflector 630 can be arranged on edges E3 and E4 of the coordinate locating device 600, so as to effectively reflect the light from the first and second light sources 621 and 622. Alternatively, the reflector 630 can be further arranged on the edge E2 of the coordinate locating device 600 as shown in FIG. 6A.

Since the first and second detectors 611 and 612 are arranged on the same edge E2 opposite to the edge E1 where a mirror 640 is arranged, both of them are able to detect light or mirrored images of objects reflected by the mirror 640.

Referring to FIG. 6B, the display apparatus 610 can also include a display panel 670 where objects to be located can move or reside, and the coordinate locating device 600 of FIG. 6A, which is arranged surrounding the display panel 670 so as to locate the coordinates of the objects. Other details of the embodiments of FIGS. 6A and 6B are similar to those in FIG. 1A and FIG. 1B and are therefore omitted here for brevity.

With the implementation shown in FIG. 6A or 6B, real images of objects intruding the coordinate locating device 600 can be captured by both the first and second detectors 611 and 612. In addition, mirrored images of the objects can be reflected by the mirror 640 and then captured by both the first and second detectors 621 and 622. After the real images and mirrored images of the objects are both captured, the coordinates of the two or more objects can be determined accordingly. Details about how the determination can be performed based on the real and mirrored images of two or more objects are provided in sequential embodiments as shown in FIGS. 7 and 8A-8D.

Figure 7:
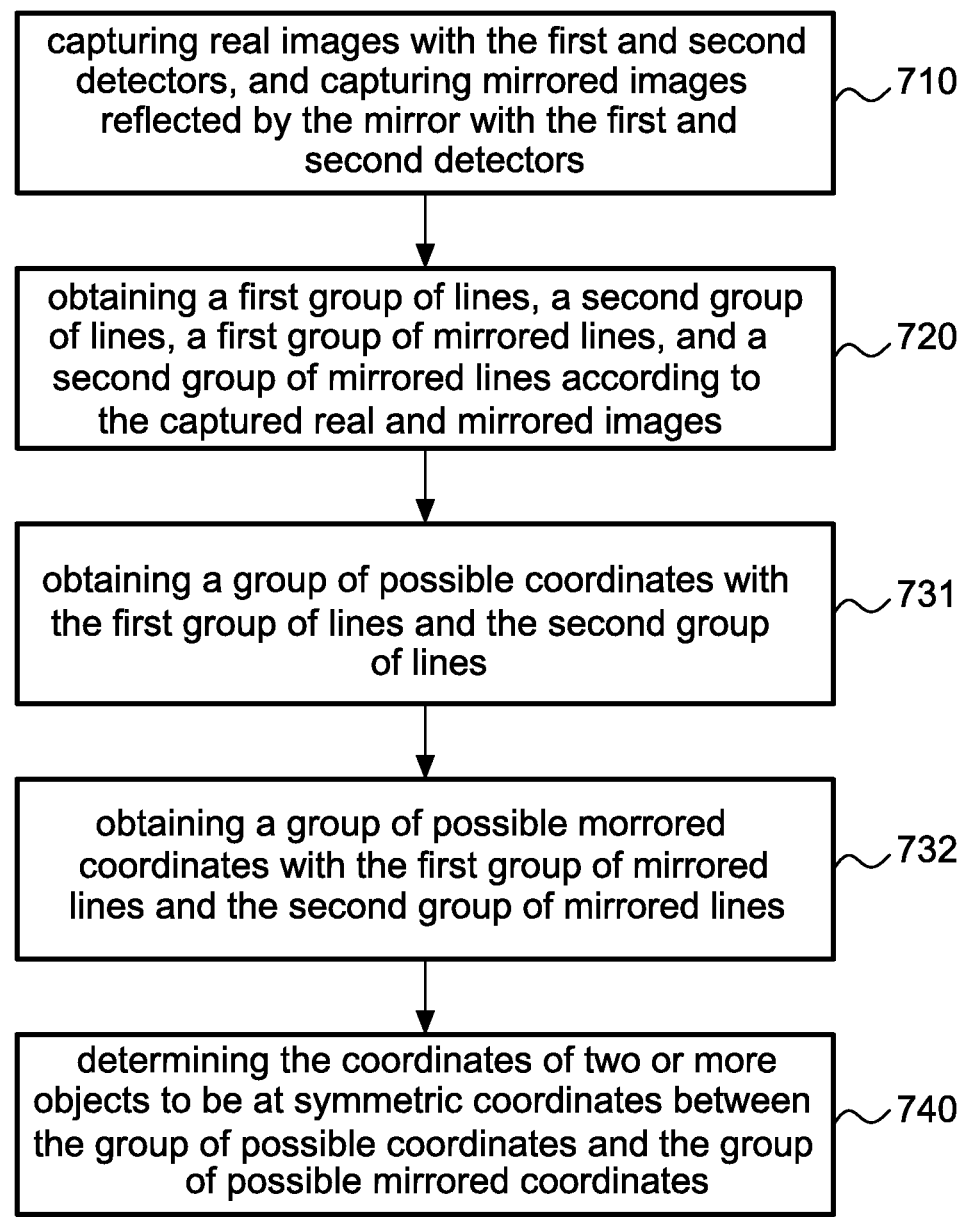
FIG. 7 is a flowchart showing steps of a locating procedure to locate the coordinates of two or more objects intruding the coordinate locating device of FIG. 6A in accordance with an embodiment.
Figure 8A:
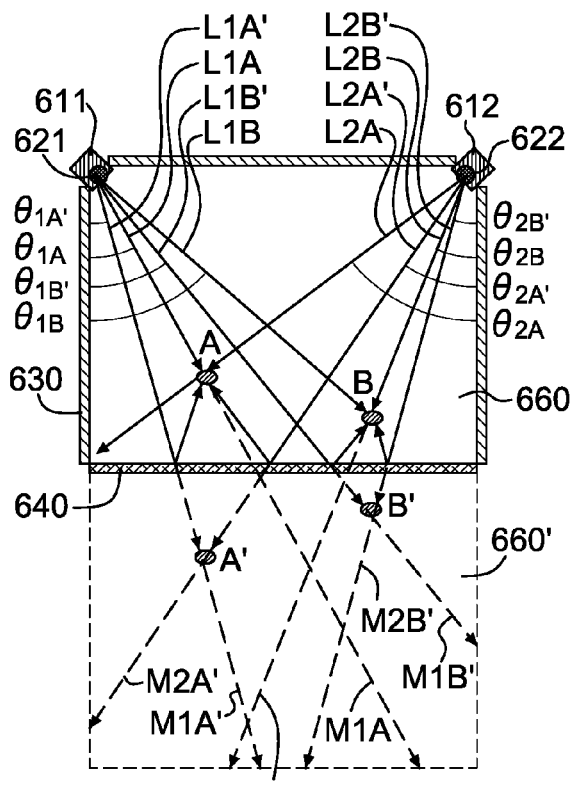
FIGS. 8A-8C are exemplary diagrams for explaining how the steps of FIG. 7 can be performed in accordance with a specific embodiment.
Figure 8B:
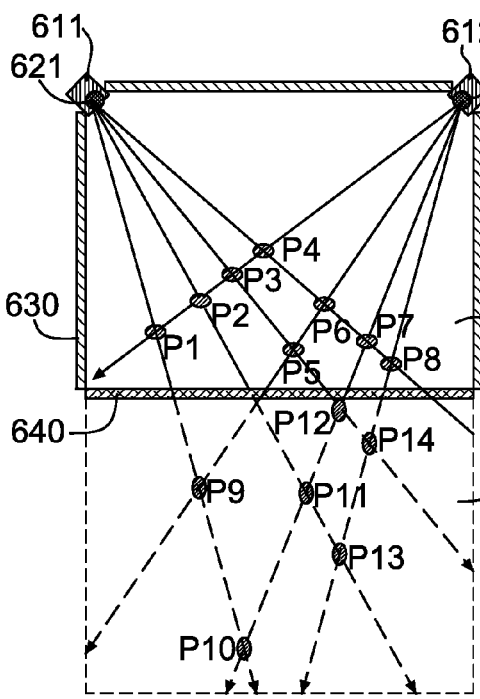
Figure 8C:
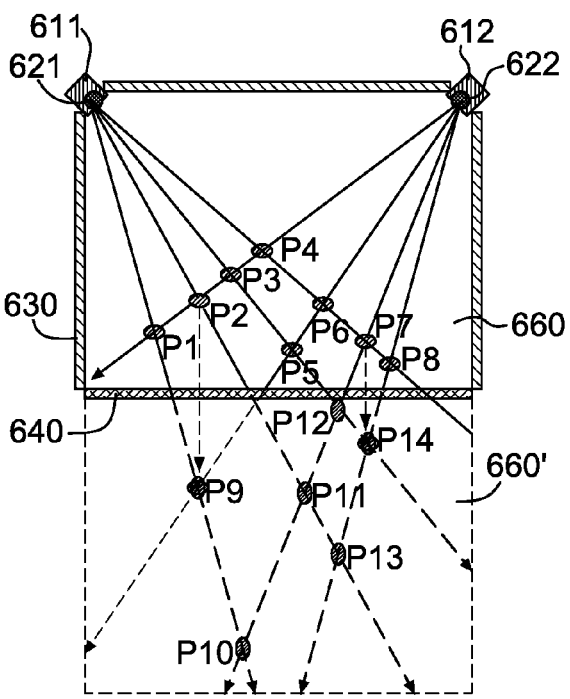

FIG. 7 is a flowchart showing steps of a locating procedure 700 to locate the coordinates of two or more objects intruding the coordinate locating device 600 of FIG. 6A in accordance with an embodiment. FIGS. 8A-8C are exemplary diagrams for explaining how the steps of FIG. 7 can be performed in accordance with a specific embodiment. In the following descriptions, the number of objects to be located is taken as two for purpose of illustration, and is not meant to imply a limitation of the disclosure.

Referring both to FIGS. 7 and 8A, the locating procedure 700 is started at step 710, where images of two objects can be captured by the first and second detectors 611 and 612. The images of the two objects can include real images A and B, and mirrored images A' and B'. Specifically, real images A and B of two objects can be captured by both the first detector 611 and the second detector 612. Additionally, the mirrored images A' and B' of the two objects can also be captured by both the first detector 611 and second detector 612, because both of the first and second detectors 611 and 612 are arranged on the edge E2 opposite to the edge E1 where the mirror 640 is arranged.

Next, the locating procedure 700 proceeds to step 720 to obtain a first group of lines including lines L1A, L1B, L1A', and L1B' and a second group of lines L2A, L2B, L2A', and L2B' according to the real images A and B and mirrored images A' and B' of the two objects captured in step 710. Additionally, a first group of mirrored lines M1A', M1A, M1B' and a second group of mirrored lines M2A', M2B, and M2B' can also be obtained in step 720.

Specifically, the lines L1A, L1B, L1A', and L1B' in the first group of lines can all reside within a location region 660 surrounded by the coordinate locating device 600 and extend from the first detector 611, and cross the real image A, the real image B, the mirrored image A', and the mirrored image B', respectively. Similarly, the lines L2A, L2B, L2A', and L2B' in the second group of lines can all reside within the location region 660, and extend from the second detector 612, and cross the real image A, the real image B, the mirrored image A', and the mirrored image B', respectively.

On the other hand, the lines M1A', M1A, M1B' in the first group of mirrored lines can all be located within a mirrored location region 660' symmetric with the location region 660 with respect to the mirror 640, and extended from corresponding lines L1A', L1A, L1B' in the first group of lines. Similarly, the lines M2A', M2B, and M2B' in the second group of mirrored lines can all be located within the mirrored location region 660', and extended from corresponding lines L2A', L2B, and L2B' in the second group of lines.

Figure 9A:
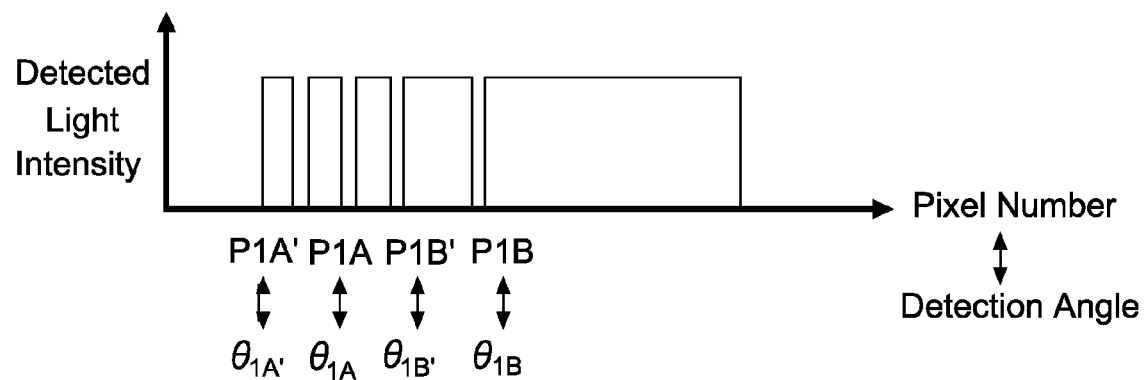
FIGS. 9A and 9B are exemplary diagrams respectively illustrating the variation in detected light intensity in relation to pixel numbers of the first and second detectors of FIG. 6A in accordance with an embodiment.
Figure 9B:
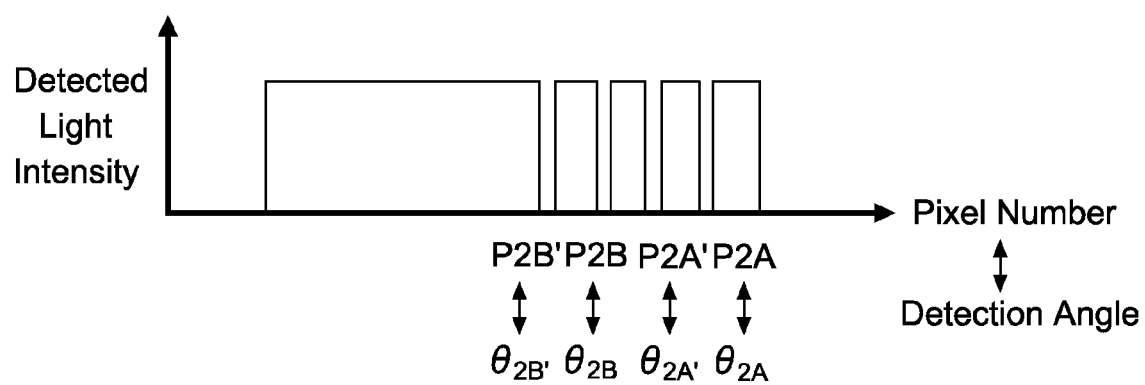

Details about how the first group of lines L1A, L1B, L1A', and L1B', the second group of lines L2A, L2B, L2A', and L2B', the first group of mirrored lines M1A', M1A, M1B', and the second group of mirrored lines M2A', M2B, and M2B' can be obtained in step 720 of FIG. 7 are further explained with sequential embodiments shown in FIGS. 9A-9B, which are exemplary diagrams respectively illustrating the variation in detected light intensity in relation to pixel numbers of the first and second detectors 611 and 612 for the embodiment shown in FIG. 8A.

Referring both to FIGS. 8A and 9A, since the light intensities detected by pixels P1A', P1A, P1B', and P1B of the first detector 611 are relatively low, detection angles $\theta_{1A}'$, $\theta_{1A}$, $\theta_{1B}'$, $\theta_{1B}$ can be obtained, respectively corresponding to the pixels P1A', P1A, P1B', and P1B. Accordingly, lines can be extended from the first detector 611 along the detection angles $\theta_{1A}'$, $\theta_{1A}$, $\theta_{1B}'$, $\theta_{1B}$ to serve as the lines L1A', L1A, L1B', and L1B in the first group of lines, which can thus cross the mirrored image A', the real image A, the mirrored image B', and the real image B of the two objects, respectively. The first group of lines L1A', L1A, L1B', and L1B are lines on which the two objects can be preliminarily estimated to be located.

Additionally, after the first group of lines L1A', L1A, L1B', and L1B are obtained, a plurality of lines can be extended from the first group of lines L1A', L1A, L1B', and L1B into the mirrored location region 660' to serve such as the lines M1A', M1A, M1B' in the first group of mirrored lines. The first group of mirrored lines M1A', M1A, M1B' are lines onto which the two objects can be preliminarily estimated to be mirrored.

Similarly, referring both to FIGS. 8A and 9B, because the light intensities detected by pixels P2B', P2B, P2A', and P2A of the second detector 612 are relatively low, detection angles $\theta_{2B}'$, $\theta_{2B}$, $\theta_{2A}'$, $\theta_{2A}$ can be obtained respectively corresponding to the pixels P2B', P2B, P2A', and P2A. Accordingly, lines can be extended from the second detector 612 along the detection angles $\theta_{2B'}$, $\theta_{2B}$, $\theta_{2A'}$, $\theta_{2A}$ to serve as the lines L2B', L2B, L2A', and L2A in the second group of lines, which can thus cross the mirrored image B', the real image B, the mirrored image A', and the real image A of the two objects, respectively. The second group of lines L2B', L2B, L2A', and L2A are also lines on which the two objects can be preliminarily estimated to be located.

Additionally, after the second group of lines L2B', L2B, L2A', and L2A are obtained, a plurality of lines can be extended from the second group of lines L2B', L2B, L2A', and L2A into the mirrored location region 660' to serve such as the lines M2B', M2B, M2A' in the second group of mirrored lines. The second group of mirrored lines M2B', M2B, M2A' are also lines onto which the two objects can be preliminarily estimated to be mirrored.

In summary, after step 720 is completed, it can be preliminarily estimated that the two objects are located on two of the first group of lines including lines L1A', L1A, L1B', and L1B, and on two of the second group of lines L2A, L2A', L2B, and L2B'. Additionally, it can also be preliminarily estimated that the two objects can be mirrored onto two of the first group of mirrored lines M1A', M1A, M1B', and onto two of the second group of mirrored lines M2A', M2B, M2B'.

Turning back to FIG. 7, the locating procedure 700 can enter steps 731 and 732, which can be performed simultaneously or sequentially. In step 731, a group of possible coordinates can be obtained with the first group of lines L1A', L1A, L1B', and L1B, and the second group of lines L2A, L2A', L2B, and L2B'. As shown in FIG. 8B, the group of possible coordinates can, for purpose of example without limiting the disclosure, include points P1-P8, which are cross points of the first group of lines L1A', L1A, L1B', and L1B, and the second group of lines L2A, L2A', L2B, and L2B'.

Similarly, in step 732, a group of possible mirrored coordinates can be obtained with the first group of mirrored lines M1A', M1A, M1B' and the second group of mirrored lines M2A', M2B, M2B'. As shown in FIG. 8B, the group of possible mirrored coordinates can for purpose of example without limiting the disclosure, include points P9, P10, P11, P12, P13, and P14, which are cross points of the first group of mirrored lines M1A', M1A, M1B' and the second group of mirrored lines M2A', M2B, M2B'.

Next, the process proceeds to step 740, where the coordinates of the two objects can be determined to be at symmetric coordinates between the group of possible coordinates (points P1-P8) and the group of possible mirrored coordinates (points P9-P14) with respect to the mirror 640. As shown in FIG. 8D, after comparing the group of possible coordinates (points P1-P8) and the group of possible mirrored coordinates (points P9-P14), it can be found that the points P2 and P9 are symmetric with each other with respect to the mirror 640, and the points P7 and P14 are symmetric with each other. As a result, the coordinates of the two objects can be determined to be at points P2 (or P9) and P7 (or P14).

Figure 10A:
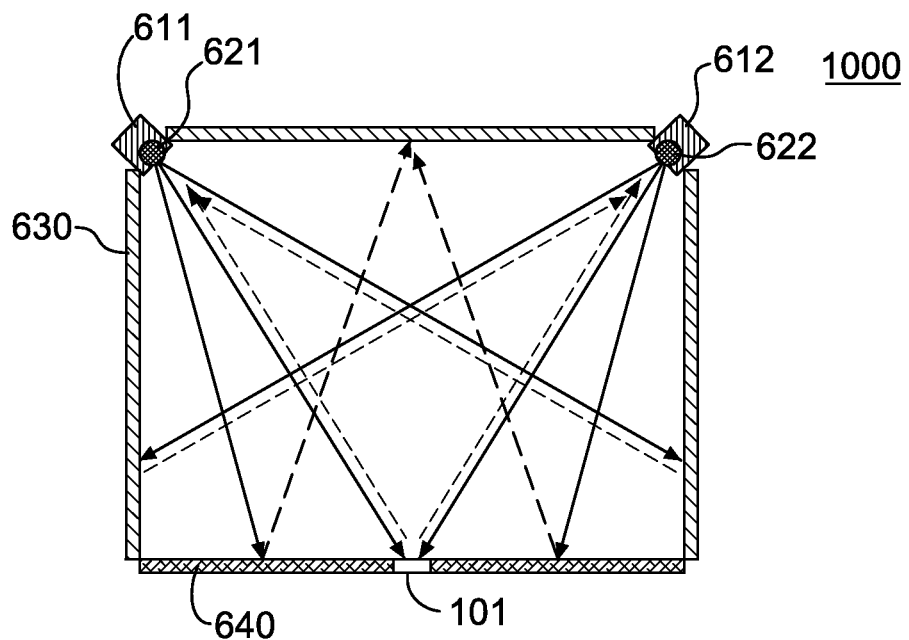
FIG. 10A is a schematic diagram showing the structure of a coordinate locating device in accordance with an embodiment.
Figure 10B:
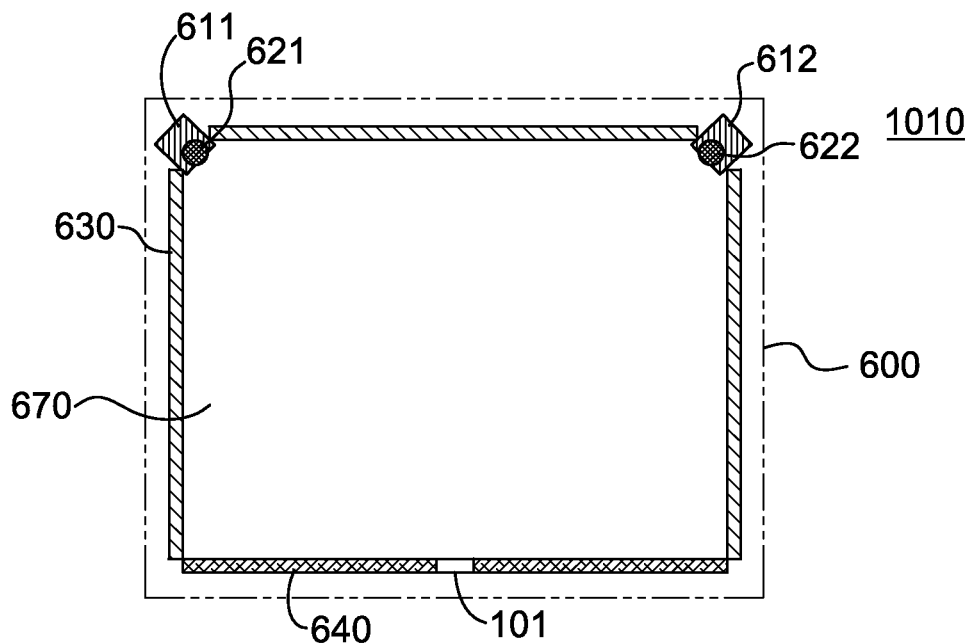
FIG. 10B is a schematic diagram showing the structure of a display apparatus employing the coordinate locating device of FIG. 10A in accordance with an embodiment.

FIG. 10A is a schematic diagram showing the structure of a coordinate locating device 1000 in accordance with further another embodiment; and FIG. 10B is a schematic diagram showing the structure of a display apparatus 1010 employing the coordinate locating device 1000 of FIG. 10A in accordance with an embodiment.

FIG. 10A is a variation of the embodiment of FIG. 6A, differing only in an addition of a reflector 101 at the middle of the edge E1 where the mirror 640 is located. The reflector 101, such as a retro-reflector, can be utilized to reduce or eliminate dead zones in the coordinate locating device 600 of FIG. 6A. Other details of the embodiments of FIGS. 10A and 10B are similar to those in FIG. 6A and FIG. 6B and are therefore omitted here for brevity. Additionally, the locating procedure 700 of FIG. 7 can also be readily applied to the coordinate locating devices 1000 of FIG. 10A.

Figure 11A:
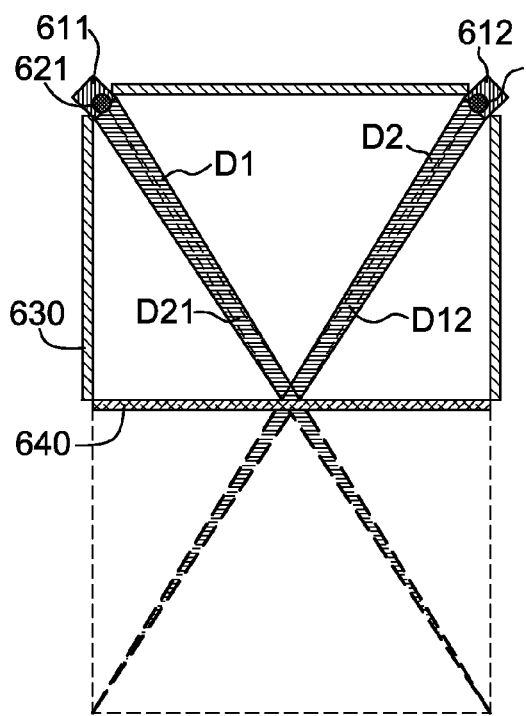
FIGS. 11A and 11B are diagrams comparing the dead zones in the coordinate locating devices of FIGS. 6A and 10A.
Figure 11B:
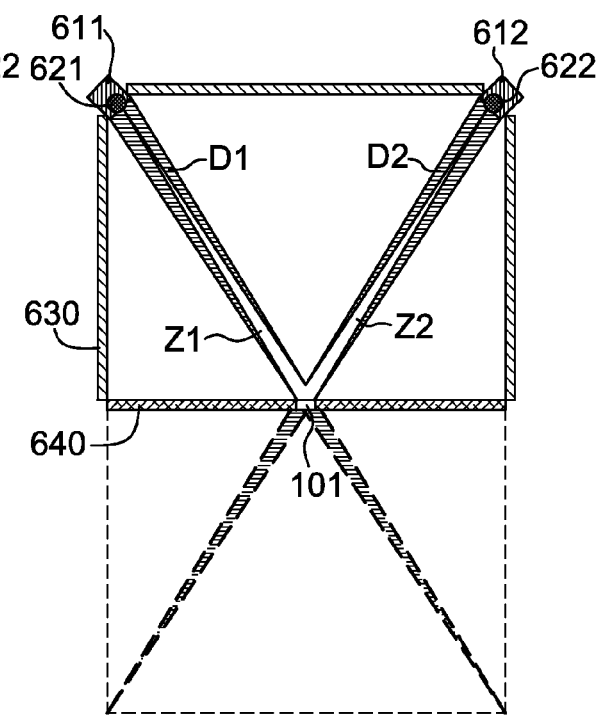

FIGS. 11A and 11B are diagrams comparing the dead zones in the coordinate locating devices 600 of FIGS. 6A and 1000 in FIG. 10A. Referring to FIG. 11A, the light emitted from the first light source 621 and passing a dead zone D21 will be reflected by the mirror 640 to the second light source 622 through a dead zone D2, the light cannot be reflected back and detected by the first detector 611. Consequently, an object within the dead zones D21 and D2 cannot be captured with the first detector 611. Similarly, light emitted from the second light source 622 and passing the dead zone D12 will be reflected by the mirror 640 to the first light source 621 through the dead zone D1, the light cannot be reflected back and detected by the second detector 612. Consequently, an object within the dead zones D12 and D1 cannot be captured with the second detector 612, either.

In comparison, referring to FIG. 11B, due to the implementation of the reflector 101, light emitted from the first light source 621 and passing the zone Z1 can be reflected back and detected by the first detector 611, and light emitted from the second light source 622 and passing the zone Z2 can be reflected back and detected by the second detector 612. Accordingly, the zones Z1 and Z2 within the dead zones D1 and D2 of FIG. 11A can be eliminated; that is, the dead zones of the coordinate locating device 1000 can be reduced. Preferably, the width of the reflector 101 can be implemented to equal the width of the light incident onto the mirror 640 from the first and second light sources 621 and 622.

Figure 12A:
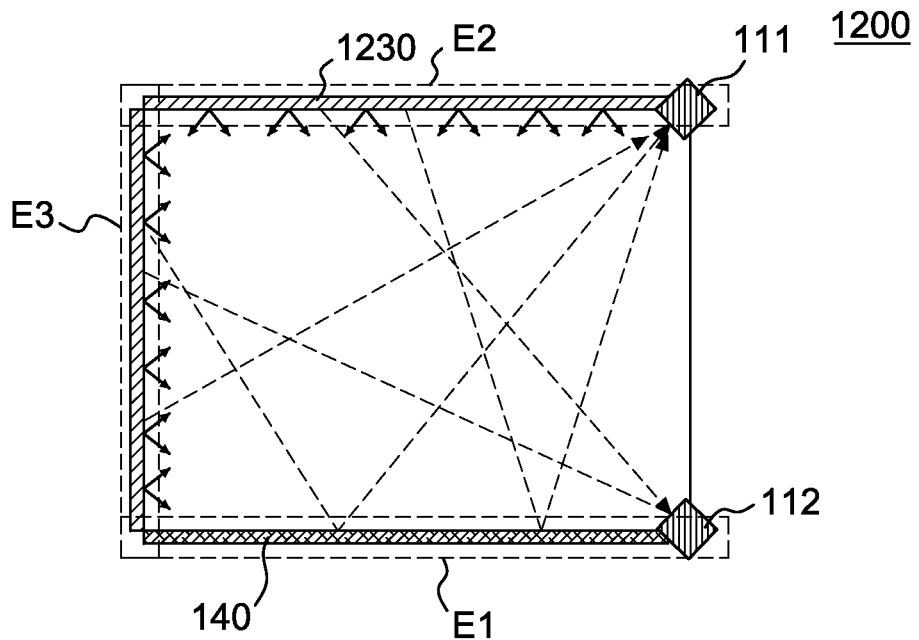
FIG. 12A is a schematic diagram showing the structure of a coordinate locating device in accordance with a varied embodiment of FIG. 1A.
Figure 12B:
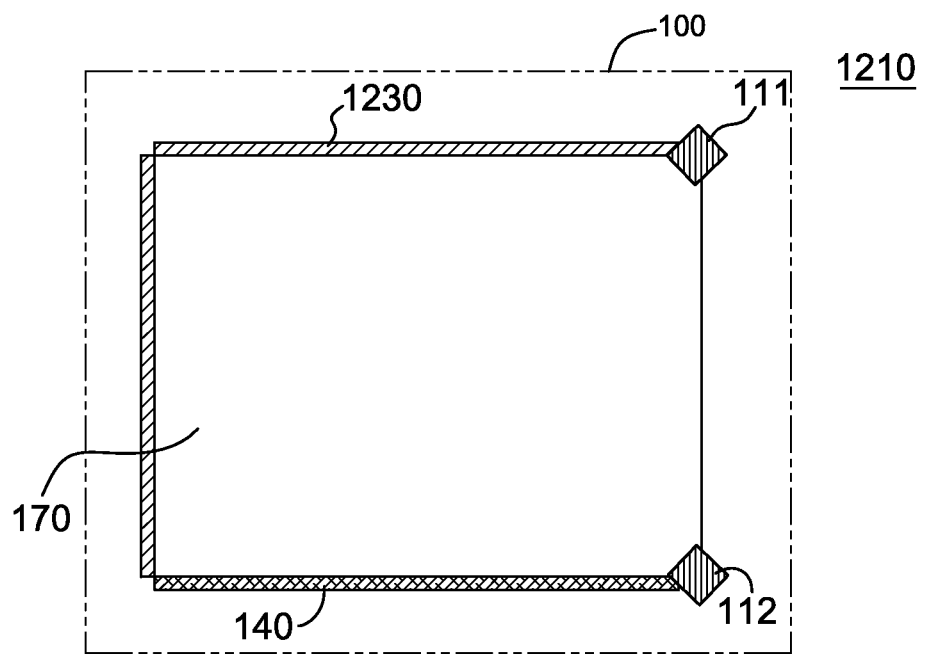
FIG. 12B is a schematic diagram showing the structure of a display apparatus employing the coordinate locating device of FIG. 12A in accordance with an embodiment.

FIG. 12A is a schematic diagram showing the structure of a coordinate locating device 1200 in accordance with further another embodiment; and FIG. 12B is a schematic diagram showing the structure of a display apparatus 1210 employing the coordinate locating device 1200 of FIG. 12A in accordance with an embodiment.

The embodiment of FIG. 12A is a variation of the embodiment of FIG. 1A differing only in that the first and light sources 121 and 122 and the reflector 130 are replaced with a light bar 1230, which can be arranged on edges E2 and E3 as the reflector 130 is arranged. The light bar 1230 can be configured to emit light, just as the first and light sources 121 and 122 and the reflector 130 can. Other details of the embodiments of FIGS. 12A and 12B are similar to those in FIG. 1A and FIG. 1B and are therefore omitted here for brevity. Additionally, the locating procedure 200 of FIG. 2 can also be readily applied to the coordinate locating devices 1200 of FIG. 12A.

Figure 13A:
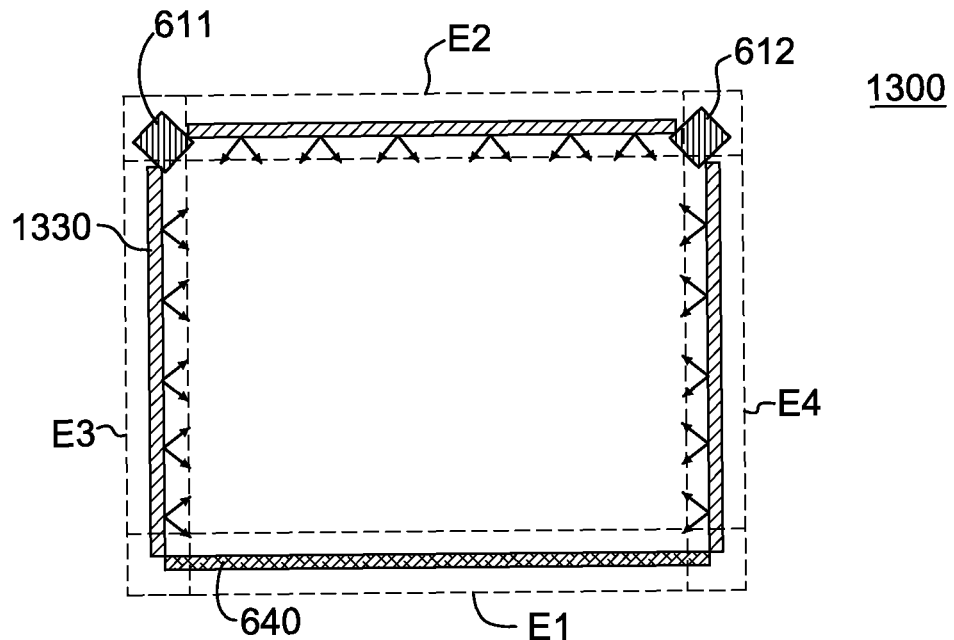
FIG. 13A is a schematic diagram showing the structure of a coordinate locating device in accordance with a varied embodiment of FIG. 6A.
Figure 13B:
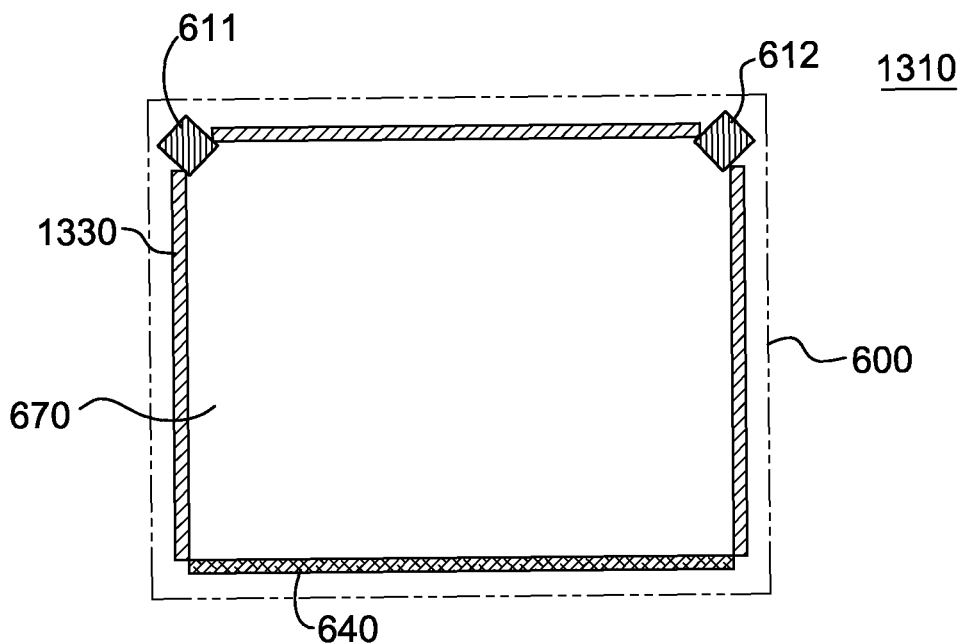
FIG. 13B is a schematic diagram showing the structure of a display apparatus employing the coordinate locating device of FIG. 13A in accordance with an embodiment.

FIG. 13A is a schematic diagram showing the structure of a coordinate locating device 1300 in accordance with further another embodiment; and FIG. 13B is a schematic diagram showing the structure of a display apparatus 1310 employing the coordinate locating device 1300 of FIG. 13A in accordance with an embodiment.

The embodiment of FIG. 13A is a variation of the embodiment of FIG. 6A, differing only in that the first and second light sources 621 and 622 and the reflector 630 are replaced with a light bar 1330, which can be arranged on edges E2, E3, and E4 (or only edges E3 and E4) as the reflector 630 is arranged. The light bar 1330 can be configured to emit light, just as the first and second light sources 621 and 622 do. Other details of the embodiments of FIGS. 13A and 13B are similar to those in FIGS. 6A and 6B and are therefore omitted here for brevity. Additionally, the locating procedure 700 of FIG. 7 can also be readily applied to the coordinate locating devices 1300 of FIG. 13A.

Compared with conventional technologies necessitating the use of three or more detectors, the coordinate locating devices in the embodiments can locate the coordinates of multiple objects by utilizing only two detectors and one mirror arranged opposite to at least one of the detectors so as to detect mirrored images of the objects, thus having reduced manufacturing costs.

While certain embodiments have been described above, it will be understood that the embodiments described are by way of example only. Accordingly, the device and methods described herein should not be limited to the described embodiments. Rather, the device and methods described herein should only be limited in light of the claims that follow when taken in conjunction with the above description and accompanying drawings.

What is claimed is:

1. A coordinate locating device for a display apparatus, comprising:
    a first detector arranged together with a first light source at a first corner of the coordinate locating device;
    a second detector arranged together with a second light source at a second corner of the coordinate locating device;
    a mirror arranged on a first edge of the coordinate locating device, configured to reflect mirrored images of two or more objects intruding the coordinate locating device;
    a reflector arranged on the middle of the first edge of the coordinate locating device, the reflector arranged on the mirror and configured to retro-reflect light from the first and second light sources; and
    at least one reflector, arranged on other edges of the coordinate locating device, configured to retro-reflect light from the first and second light sources; wherein
    the first and second detectors detect real images of the two or more objects, and
    at least one of the first and second detectors further detects the mirrored images of the two or more objects reflected by the mirror;
    wherein the position of the two or more objects are determined according to the detected real images and mirrored images of the two or more objects.

2. The coordinate locating device of claim 1, wherein one of the first and second corners is on the first edge of the coordinate locating device, and the other of the first and second corners is on a second edge of the coordinate locating device opposite to the first edge.

3. The coordinate locating device of claim 1, wherein the first and second corners are both on a second edge of the coordinate locating device opposite to the first edge of the coordinate locating device.

4. The coordinate locating device of claim 2, wherein the at least one reflector is a retro-reflector arranged on the second edge and a third edge of the coordinate locating device between the first and second edges.

5. The coordinate locating device of claim 3, wherein the at least one reflector is a retro-reflector arranged on third and fourth edges of the coordinate locating device between the first and second edges.

6. The coordinate locating device of claim 1, the width of the reflector on the first edge of the coordinate locating device equals to the width of the incident light on the first edge from the first and second light source.

7. The coordinate locating device of claim 1, further comprising an interface connectable to the display apparatus.

8. A display apparatus comprising the coordinate locating device of claim 1 and a display panel, wherein the coordinate locating device is arranged surrounding the display panel.

\* \* \* \* \*